United States Patent
Jacob et al.

(10) Patent No.: US 7,445,846 B2
(45) Date of Patent: Nov. 4, 2008

(54) THERMOPLASTIC VULCANIZATES AND LAMINATES MADE THEREWITH

(75) Inventors: Sunny Jacob, Akron, OH (US); William Gary Stevenson, Uniontown, OH (US)

(73) Assignee: Advanced Elastomer Systems, L.P., Akron, OH (US)

( * ) Notice: Subject to any disclaimer, the term of this patent is extended or adjusted under 35 U.S.C. 154(b) by 503 days.

(21) Appl. No.: 11/097,434

(22) Filed: Apr. 1, 2005

(65) Prior Publication Data

US 2006/0222861 A1  Oct. 5, 2006

(51) Int. Cl.
| B32B 25/08 | (2006.01) |
| B32B 25/14 | (2006.01) |
| B32B 25/16 | (2006.01) |

(52) U.S. Cl. ............. 428/421; 428/422; 428/516; 428/517; 428/519; 428/521; 428/523

(58) Field of Classification Search ............. 428/421, 428/422, 516, 517, 519, 521, 523
See application file for complete search history.

(56) References Cited

U.S. PATENT DOCUMENTS

| 4,130,535 | A | * | 12/1978 | Coran et al. ............. 524/487 |
| 4,361,672 | A | | 11/1982 | Agarwal |
| 5,163,976 | A | | 11/1992 | Ravipati |
| 5,217,797 | A | * | 6/1993 | Knox et al. ............. 428/167 |
| 5,859,114 | A | | 1/1999 | Davis |
| 6,147,160 | A | * | 11/2000 | Wang et al. ............. 525/106 |
| 6,503,984 | B2 | | 1/2003 | Johnson et al. ............. 525/70 |
| 6,790,911 | B2 | | 9/2004 | Perevosnik |
| 2004/0127629 | A1 | | 7/2004 | Jacob |
| 2004/0266948 | A1 | | 12/2004 | Jacob |
| 2005/0148727 | A1 | * | 7/2005 | Ajbani et al. ............. 525/63 |

FOREIGN PATENT DOCUMENTS

| EP | 0518045 A1 | 12/1992 |
| WO | WO 92/12212 | 7/1992 |
| WO | 02/48257 A2 | 6/2002 |
| WO | WO 2004/044052 A1 | 5/2004 |

* cited by examiner

Primary Examiner—Ramsey Zacharia

(57) ABSTRACT

A thermoplastic vulcanizate comprising a) a dynamically vulcanized rubber, b) a thermoplastic resin, and c) optionally a synthetic oil, where the thermoplastic vulcanizate is substantially devoid of mineral oils.

15 Claims, 1 Drawing Sheet

THERMOPLASTIC VULCANIZATES AND LAMINATES MADE THEREWITH

FIELD OF THE INVENTION

This invention is directed toward thermoplastic vulcanizates and laminates therewith; one or more embodiments are directed toward laminates that include fluorinated polymers or high density polyethylene as a layer.

BACKGROUND OF THE INVENTION

Many laminates are prepared that include a low-friction layer. In many instances, low-friction layers include materials such as polytetrafluoroethylene or high density polyethylene. While these low-friction layers are technologically useful against contact surfaces, they often present problems in the manufacture of laminates inasmuch as it can be difficult to adhere other materials thereto.

For example, many pieces of furniture, especially chairs, include one or more sliders, which are devices affixed to furniture at a location where the furniture contacts the floor. For example, legs of chairs often include small discs affixed at their bottom that allow the chair to slide across the floor.

Technologically useful furniture sliders exhibit several advantageous physical and mechanical characteristics. First, the surface of the slider that contacts the floor desirably has a low coefficient of friction and high abrasion resistance. Also, sliders desirably have a low compression set so that they can recover after bearing a load. Further, it is desirable that the sliders provide some degree of damping so that the slider will absorb mechanical energy that may be created as furniture slides over a surface or floor.

Materials such as polytetrafluoroethylene and high density polyethylene can have a low coefficient of friction and high abrasion resistance and are often used in the manufacture of furniture sliders. Unfortunately, these materials often do not provide advantageous damping, and their compression set is often not desirable for this use.

As a result, it is common for furniture sliders to include multiple layers of materials; i.e., they are often laminates. These laminates include a first layer that includes a material having a low coefficient of friction and high abrasion resistance such as polytetrafluoroethylene, and a second layer that includes an elastomeric material that has low compression set and the ability to dampen vibrational energy.

The manufacture of these laminates, however, is often problematic. In particular, because many elastomeric materials are thermosets, the elastomeric portion of the laminate is often cast onto a substrate that includes a material such as polytetrafluoroethylene. As those skilled in the art appreciate, the casting of the elastomeric layer can often entail time-consuming and intricate processes. Further problems are encountered in that materials that exhibit a low coefficient friction and high abrasion resistance often do not bond well to other materials. As a result, the formation of a laminate can be problematic.

Thermoplastic vulcanizates are thermoplastic elastomers. In other words, thermoplastic vulcanizates exhibit many of the properties of thermoset rubbers, yet they are processable as thermoplastics. As a result, they offer a unique processing advantage over the use of thermoset elastomers. Indeed, they could offer an advantage in the manufacture of laminates including furniture sliders because casting processes could be eliminated.

Unfortunately, thermoplastic vulcanizates known heretofore in the art have not proven to be technologically useful in the manufacture of furniture slider laminates because adhesion to materials such as polytetrafluoroethylene has not been adequate for furniture slider applications. This is true despite the fact that thermoplastic vulcanizates exist that demonstrate technologically useful adhesion to a number of substrates.

SUMMARY OF THE INVENTION

In general the present invention provides a thermoplastic vulcanizate comprising a) a dynamically vulcanized rubber, b) a thermoplastic resin, and c) optionally a synthetic oil, where the thermoplastic vulcanizate is substantially devoid of mineral oils.

The present invention also includes a laminate comprising a first layer comprising a fluorine-containing thermoplastic resin or a high-density polyethylene resin, and a second layer contacting said first layer, where the second layer includes a thermoplastic vulcanizate including a) a dynamically vulcanized rubber, b) a thermoplastic resin, and c) optionally a synthetic oil where the thermoplastic vulcanizate is substantially devoid of mineral oils.

DETAILED DESCRIPTION OF ILLUSTRATIVE EMBODIMENTS

Figure 1:
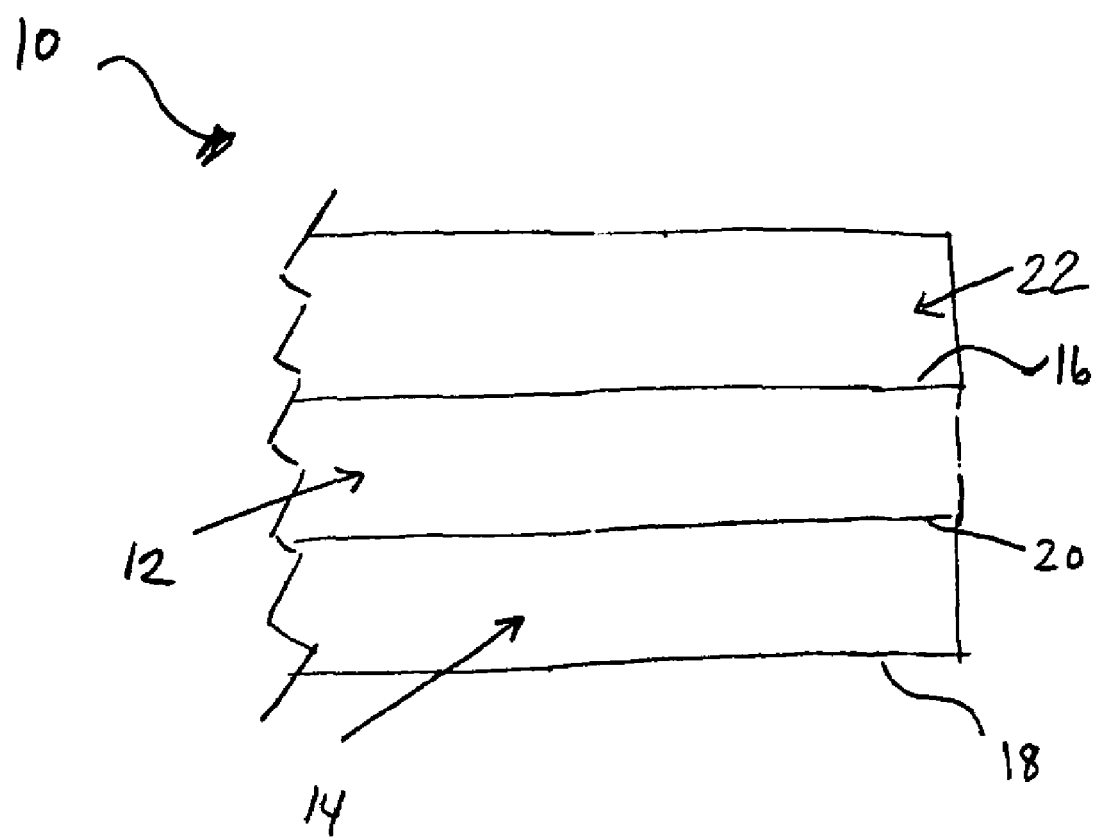
FIG. 1 is a cross-sectional side view of a furniture slider according to an embodiment of the present invention.

It has unexpectedly been discovered that thermoplastic vulcanizates that are substantially devoid of mineral oils demonstrate technologically useful adhesion to high density polyethylene and surface-modified fluorinated thermoplastics. In one or more embodiments, these thermoplastic vulcanizates include synthetic oils. One or more embodiments of this invention are directed to these thermoplastic vulcanizates. Other embodiments are directed toward laminates including these thermoplastic vulcanizates and fluorinated thermoplastics or high density polyethylene, as well as articles made therefrom.

In one or more embodiments, the thermoplastic vulcanizates of this invention include dynamically-cured rubber, a thermoplastic resin, optionally a synthetic oil, optionally a hardness or adhesion modifier, optionally a tackifier, and optionally other components or constituents that are typically included in thermoplastic vulcanizates.

Any rubber or mixture thereof that is capable of being dynamically cured may be used. Reference to a rubber may include mixtures of more than one rubber. Non-limiting examples of useful rubbers include olefinic elastomeric copolymers, natural rubber, styrene-butadiene copolymer rubber, butadiene rubber, butyl rubber, acrylonitrile rubber, butadiene-styrene-vinyl pyridine rubber, urethane rubber, and polyisoprene rubber.

The term olefinic elastomeric copolymer refers to rubbery copolymers polymerized from ethylene, at least one α-olefin monomer, and optionally at least one diene monomer. The α-olefins may include, but are not limited to, propylene, 1-butene, 1-hexene, 4-methyl-1 pentene, 1-octene, 1-decene, or combinations thereof. In one embodiment, the α-olefins include propylene, 1-hexene, 1-octene or combinations thereof. The diene monomers may include, but are not limited to, 5-ethylidene-2-norbornene; 5-vinyl-2-norbornene; divinyl benzene; 1,4-hexadiene; 5-methylene-2-norbornene; 1,6-octadiene; 5-methyl-1,4-hexadiene; 3,7-dimethyl-1,6-octadiene; 1,3-cyclopentadiene; 1,4-cyclohexadiene;

dicyclopentadiene; or a combination thereof. In the event that the copolymer is prepared from ethylene, α-olefin, and diene monomers, the copolymer may be referred to as a terpolymer or even a tetrapolymer in the event that multiple α-olefins or dienes are used.

In one or more embodiments, the olefinic elastomeric copolymers include from about 12 to about 85% by weight, or from about 55 to about 75% by weight, or from about 60 to about 70% by weight, and or from about 61 to about 66% by weight ethylene units deriving from ethylene monomer, and from about 0.1 to about 15% by weight, or from about 0.5 to about 12% by weight, or from about 1 to about 10% by weight, or from about 2 to about 8% by weight diene units deriving from diene monomer, with the balance including α-olefin units (such as propylene) deriving from α-olefin monomer. Expressed in mole percent, the terpolymer of one embodiment includes from about 0.1 to about 5 mole percent, or from about 0.5 to about 4 mole percent, or from about 1 to about 2.5 mole percent diene units deriving from diene monomer.

In one or more embodiments, useful olefinic elastomeric copolymers have a weight average molecular weight ($M_w$) that is greater than 50,000, in other embodiments greater than 100,000, in other embodiments greater than 200,000, and in other embodiments greater than 300,000; and the weight average molecular weight of the preferred olefinic elastomeric copolymers of one embodiment is less than 1,200,000, in other embodiments less than 1,000,000, in other embodiments less than 900,000, and in other embodiments less than 800,000. In one or more embodiments, useful olefinic elastomeric copolymers have a number average molecular weight ($M_n$) that greater than 20,000, in other embodiments greater than 60,000, in other embodiments greater than 100,000, and in other embodiments greater than 150,000; and the number average molecular weight of the olefinic elastomeric copolymers of one or more embodiments is less than 500,000, in other embodiments less than 400,000, in other embodiments less than 300,000, and in other embodiments less than 250,000.

In one or more embodiments, useful olefinic elastomeric copolymers may also be characterized by having a Mooney viscosity ($ML_{(1+4)}$ at 125° C.) per ASTM D 1646, of from about 20 to about 500 or from about 75 to about 450.

In one or more embodiments, useful olefinic elastomeric copolymers may be characterized by having an inherent viscosity, as measured in Decalin at 135° C., up from about 0.5 to about 8 dl/g, or from about 3 to about 7 dl/g, or from about 4 to about 6.5 dl/g.

Useful olefinic elastomeric copolymers may be manufactured or synthesized by using a variety of techniques. For example, these copolymers can be synthesized by employing solution, slurry, or gas phase polymerization techniques that employ numerous catalyst systems including Ziegler-Natta systems, single-site catalysts including vanadium catalysts and Group IV-VI metallocenes, and Brookhart catalysts. Elastomeric copolymers are commercially available under the tradenames Vistalon™ (ExxonMobil Chemical Co.; Houston, Tex.), VISTAMAXX™ (ExxonMobil), Keltan™ (DSM Copolymers; Baton Rouge, La.), Nordel™ IP (DuPont Dow Elastomers; Wilmington, Del.), NORDEL MG™ (DuPont Dow Elastomers), Royalene™ (Crompton) and Buna™ (Bayer Corp.; Germany).

In one or more embodiments, butyl rubber includes copolymers and terpolymers of isobutylene and at least one other comonomer. Useful comonomers include isoprene, divinyl aromatic monomers, alkyl substituted vinyl aromatic monomers, and mixtures thereof. Exemplary divinyl aromatic monomers include vinyl styrene. Exemplary alkyl substituted vinyl aromatic monomers include α-methyl styrene and paramethyl styrene. These copolymers and terpolymers may also be halogenated such as in the case of chlorinated and brominated butyl rubber.

In one or more embodiments, butyl rubber includes copolymers of isobutylene and isoprene, copolymers of isobutylene and paramethyl styrene, as described in U.S. Pat. No. 5,013,793, which is incorporated herein by reference for purpose of U.S. patent practice, terpolymers of isobutylene, isoprene, and divinyl styrene, as described in U.S. Pat. No. 4,916,180, which is incorporated herein by reference for purpose of U.S. patent practice, and star branched butyl rubber, as described in U.S. Pat. No. 6,255,389, which is incorporated herein by reference for purpose of U.S. patent practice. These preferred copolymers and terpolymers may be halogenated.

In one embodiment, where butyl rubber includes the isobutylene-isoprene copolymer, the copolymer may include from about 0.5 to about 30, or from about 0.8 to about 5, percent by weight isoprene based on the entire weight of the copolymer with the remainder being isobutylene.

In another embodiment, where butyl rubber includes isobutylene-paramethyl styrene copolymer, the copolymer may include from about 0.5 to about 25, and from about 2 to about 20, percent by weight paramethyl styrene based on the entire weight of the copolymer with the remainder being isobutylene. In one embodiment, isobutylene-paramethyl styrene copolymers can be halogenated, such as with bromine, and these halogenated copolymers can contain from about 0 to about 10 percent by weight, or from about 0.3 to about 7 percent by weight halogenation.

In other embodiments, where butyl rubber includes isobutylene-isoprene-divinyl styrene, the terpolymer may include from about 95 to about 99, or from about 96 to about 98.5, percent by weight isobutylene, and from about 0.5 to about 5, or from about 0.8 to about 2.5, percent by weight isoprene based on the entire weight of the terpolymer, with the balance being divinyl styrene.

In the case of halogenated butyl rubbers, the butyl rubber may include from about 0.1 to about 10, or from about 0.3 to about 7, or from about 0.5 to about 3 percent by weight halogen based upon the entire weight of the copolymer or terpolymer.

In one or more embodiments, the glass transition temperature (Tg) of useful butyl rubber can be less than about −55° C., or less than about −58° C., or less than about −60° C., or less than about −63° C.

In one or more embodiments, the Mooney viscosity ($ML_{1+8}$@125° C.) of useful butyl rubber can be from about 25 to about 75, or from about 30 to about 60, or from about 40 to about 55.

Useful butyl rubber includes that prepared by polymerization at low temperature in the presence of a Friedel-Crafts catalyst as disclosed within U.S. Pat. Nos. 2,356,128 and 2,944,576. Other methods may also be employed.

Butyl rubber can be obtained from a number of commercial sources as disclosed in the Rubber World Blue Book. For example, both halogenated and un-halogenated copolymers of isobutylene and isoprene are available under the tradename Exxon Butyl™ (ExxonMobil Chemical Co.), halogenated and un-halogenated copolymers of isobutylene and paramethyl styrene are available under the tradename EXXPRO™ (ExxonMobil Chemical Co.), and star branched butyl rubbers are available under the tradename STAR BRANCHED BUTYL™ (ExxonMobil Chemical Co.). Halogenated and non-halogenated terpolymers of isobutylene, isoprene, and divinyl styrene are available under the tradename Polysar Butyl™ (Bayer; Germany).

The rubber may be partially of fully cured or crosslinked. In one embodiment, the rubber is advantageously completely or fully cured. The degree of cure can be measured by determining the amount of rubber that is extractable from the thermoplastic vulcanizate by using cyclohexane or boiling xylene as an extractant. This method is disclosed in U.S. Pat. No. 4,311,628, which is incorporated herein by reference for purpose of U.S. patent practice. In one embodiment, the rubber has a degree of cure where not more than 15 weight percent, in other embodiments not more than 10 weight percent, in other embodiments not more than 5 weight percent, and in other embodiments not more than 3 weight percent is extractable by cyclohexane at 23° C. as described in U.S. Pat. Nos. 5,100,947 and 5,157,081, which are incorporated herein by reference for purpose of U.S. patent practice. Alternatively, in one or more embodiments, the rubber has a degree of cure such that the crosslink density is preferably at least $4 \times 10^{-5}$, in other embodiments at least $7 \times 10^{-5}$, and in other embodiments at least $10 \times 10^{-5}$ moles per milliliter of rubber. See also "Crosslink Densities and Phase Morphologies in Dynamically Vulcanized TPEs," by Ellul et al., RUBBER CHEMISTRY AND TECHNOLOGY, Vol 68, pp. 573-584 (1995).

The rubber can be cured by employing a variety of curatives. Exemplary curatives include phenolic resin cure systems, peroxide cure systems, and silicon-containing cure systems.

In one or more embodiments, the phenolic resins include those disclosed in U.S. Pat. Nos. 2,972,600, 3,287,440, 5,952, 425 and 6,437,030, and International Application No. PCT/US04/30518, which are incorporated herein by reference for purpose of U.S. patent practice.

Phenolic resin curatives can be referred to as resole resins, and include those resins made by the condensation of alkyl substituted phenols or unsubstituted phenols with aldehydes, such as formaldehydes, in an alkaline medium or by condensation of bi-functional phenoldialcohols. The alkyl substituents of the alkyl substituted phenols may contain 1 to about 10 carbon atoms. Dimethylolphenols or phenolic resins, substituted in para-positions with alkyl groups containing 1 to about 10 carbon atoms are preferred. In one embodiment, a blend of octyl phenol and nonylphenol-formaldehyde resins are employed. The blend may include from about 25 to about 40% by weight octyl phenol and from about 75 to about 60% by weight nonylphenol (optionally from about 30 to about 35 weight percent octyl phenol and from about 70 to about 65 weight percent nonylphenol). In one embodiment, the blend includes about 33% by weight octylphenol-formaldehyde and about 67% by weight nonylphenol formaldehyde resin, where each of the octylphenol and nonylphenol include methylol groups. This blend can be solubilized in paraffinic oil at about 30% solids.

Useful phenolic resins may be obtained under the tradenames SP-1044, SP-1045 (Schenectady International; Schenectady, N.Y.), which are referred to as alkylphenol-formaldehyde resins. SP-1045 is believed to be an octylphenol-formaldehyde resin that contains methylol groups. The SP-1044 and SP-1045 resins are believed to be essentially free of halogen substituents or residual halogen compounds. By essentially free of halogen substituents, it is meant that the synthesis of the resin provides for a non-halogenated resin that may only contain trace amounts of halogen containing compounds.

In one or more embodiments, the phenolic resin can be used in combination with the halogen source, such as stannous chloride, and a metal oxide or reducing compound such as zinc oxide.

In one ore more embodiments, useful peroxide curatives include organic peroxides. Examples of organic peroxides include, but are not limited to, di-tert-butyl peroxide, dicumyl peroxide, t-butylcumyl peroxide, $\alpha,\alpha$-bis(tert-butylperoxy) diisopropyl benzene, 2,5-dimethyl-2,5-di(t-butylperoxy) hexane (DBPH), 1,1-di(tert-butylperoxy)-3,3,5-trimethyl cyclohexane, n-butyl-4-4-bis(tert-butylperoxy) valerate, benzoyl peroxide, lauroyl peroxide, dilauroyl peroxide, 2,5-dimethyl-2,5-di(tert-butylperoxy)hexyne-3, and mixtures thereof. Also, diaryl peroxides, ketone peroxides, peroxydicarbonates, peroxyesters, dialkyl peroxides, hydroperoxides, peroxyketals and mixtures thereof may be used. Useful peroxides and their methods of use in dynamic vulcanization of thermoplastic vulcanizates are disclosed in U.S. Pat. No. 5,656,693, which is incorporated herein by reference for purpose of U.S. patent practice.

In one or more embodiments, the peroxide curatives are employed in conjunction with a coagent. Examples of coagents include triallylcyanurate, triallyl isocyanurate, triallyl phosphate, sulfur, N-phenyl bis-maleamide, zinc diacrylate, zinc dimethacrylate, divinyl benzene, 1,2 polybutadiene, trimethylol propane trimethacrylate, tetramethylene glycol diacrylate, trifunctional acrylic ester, dipentaerythritolpentacrylate, polyfunctional acrylate, retarded cyclohexane dimethanol diacrylate ester, polyfunctional methacrylates, acrylate and methacrylate metal salts, oximer for e.g., quinone dioxime. In order to maximize the efficiency of peroxide/coagent crosslinking the mixing and dynamic vulcanization are preferably carried out in a nitrogen atmosphere.

In one or more embodiments, useful silicon-containing cure systems include silicon hydride compounds having at least two SiH groups. It is believed that these compounds react with carbon-carbon double bonds of unsaturated polymers in the presence of a hydrosilation catalyst. Silicon hydride compounds that are useful in practicing the present invention include, but are not limited to, methylhydrogen polysiloxanes, methylhydrogen dimethyl-siloxane copolymers, alkyl methyl polysiloxanes, bis(dimethylsilyl)alkanes, bis(dimethylsilyl)benzene, and mixtures thereof.

Useful catalysts for hydrosilation include, but are not limited to, peroxide catalysts and catalysts including transition metals of Group VIII. These metals include, but are not limited to, palladium, rhodium, and platinum, as well as complexes of these metals. For a further discussion of the use of hydrosilation to cure thermoplastic vulcanizates, reference can be made to U.S. Pat. No. 5,936,028, which is incorporated herein by reference for purpose of U.S. patent practice. In one or more embodiments, a silicon-containing curative can be employed to cure an elastomeric copolymer including units deriving from 5-vinyl-2-norbornene.

In one or more embodiments, curatives that are useful for curing butyl rubber include those described in U.S. Pat. Nos. 5,013,793, 5,100,947, 5,021,500, 4,978,714, and 4,810,752, which are incorporated herein by reference for purpose of U.S. patent practice.

In one or more embodiments, exemplary thermoplastic resins include crystalline and crystallizable polyolefins. Also, the thermoplastic resins may include copolymers of polyolefins with styrene such as styrene-ethylene copolymer. In one or more embodiments, the thermoplastic resins are formed by polymerizing ethylene or $\alpha$-olefins such as propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene and ethylene and propylene with another α-olefin such as 1-butene, 1-hexene, 1-octene, 2-methyl-1-propene, 3-methyl-1-pentene, 4-methyl-1-pentene, 5-methyl-1-hexene or mixtures thereof is also contemplated. Specifically included are the reactor, impact, and random copolymers of propylene with ethylene or the higher α-olefins, described above, or with $C_{10}$-$C_{20}$ diolefins. Comonomer contents for these propylene copolymers will typically be from 1 to about 30% by weight of the polymer, for example, See U.S. Pat. Nos. 6,268, 438, 6,288,171, and 6,245,856. Copolymers available under the tradename VISTAMAXX™ (ExxonMobil) are specifically included. Blends or mixtures of two or more polyolefin thermoplastics such as described herein, or with other polymeric modifiers, are also suitable in accordance with this invention. These homopolymers and copolymers may be synthesized by using an appropriate polymerization technique known in the art such as, but not limited to, the conventional Ziegler-Natta type polymerizations, and catalysis employing single-site organometallic catalysts including, but not limited to, metallocene catalysts.

In one or more embodiments, these thermoplastic resins may be characterized by an $M_w$ of from about 75,000 to about 1,000,000 and in other embodiments from about 150,000 to about 500,000. They can also be characterized by an $M_n$ of about 40,000 to about 500,000, and in other embodiments about 60,000 to about 120,000.

In one or more embodiments, these thermoplastic resins can have a melt flow rate that is greater than about 0.5 dg/min, in other embodiments greater than about 5 dg/min, in other embodiments greater than about 10 dg/min, and in other embodiments greater than about 15 dg/min, per ASTM D-1238 at 230° C. and 2.16 kg load.

In one ore more embodiments, these thermoplastic resins also can have a melt temperature ($T_m$) that is from about 150° C. to about 250° C., optionally from about 155 to about 170° C., and optionally from about 160° C. to about 165° C. They may have a glass transition temperature ($T_g$) of from about −10 to about 10° C., optionally from about −3 to about 5° C., and optionally from about 0 to about 2° C. They may have a crystallization temperature ($T_c$) of these resins is optionally at least about 75° C., optionally at least about 95° C., optionally at least about 100° C., and optionally at least 105° C., with one embodiment ranging from 105° to 115° C.

Also, these thermoplastic resins may be characterized by having a heat of fusion of at least 25 J/g, optionally in excess of 50 J/g, optionally in excess of 75 J/g, and optionally in excess of 95 J/g.

In one or more embodiments, the thermoplastic vulcanizates of this invention are substantially devoid of polyethylene resins. By substantially devoid, it is meant that the thermoplastic vulcanizates include less polyethylene resin than would otherwise have an appreciable impact on the technological features of the thermoplastic vulcanizate. In one or more embodiments, the thermoplastic vulcanizate includes less than 5, and in another embodiments less than 1% by weight polyethylene resin. In one embodiments, the thermoplastic vulcanizates are devoid of polyethylene resin. In one or more embodiments, polyethylene resins include those polymers that include at least 50 mole percent, and in other embodiments at least 90%, and in other embodiments at least 99 mole percent ethylenyl mer units, which include those units deriving from the polymerization of ethylene.

In one or more embodiments, useful hardness or adhesion modifiers include maleated thermoplastics, thermoplastic elastomer block copolymers, crystallizable copolymers of propylene with ethylene or other higher α-olefins, chlorinated thermoplastics, ionomers, and mixtures thereof.

Modified thermoplastics include polyolefins having at least one functional groups attached thereto. In one or more embodiments, these functional groups can include carboxylic acid; $C_1$ to $C_8$ carboxylate ester such as carbomethoxy, carboethoxy, carbopropoxy, carbobutoxy, carbopentoxy, carbohexoxy, carboheptoxy, carboctoxy, and isomeric forms thereof; carboxylic acid anhydride; carboxylate salts formed from the neutralization of carboxylic acid group(s) with metal ions from Groups I, II, III, IV-A and VII of the periodic table, illustratively including sodium, potassium, lithium, magnesium, calcium, iron, nickel, zinc, and aluminum, and mixtures thereof; amide; epoxy; hydroxy; amino; and $C_2$ to $C_6$ acyloxy such as acetoxy, propionyloxy, or butyryloxy. In one or more embodiments, these functional groups may be part of an unsaturated monomer precursor that can be copolymerized with an olefin monomer or grafted onto a polyolefin to form the modified polyolefin.

Useful functionalizing monomers or agents include acrylic acid, methacrylic acid, maleic acid, maleic anhydride, acrylamide, methacrylamide, glycidyl acrylate, glycidyl methacrylate, vinyl acetate, vinyl butyrate, methyl acrylate, ethyl acrylate, butyl acrylate, 2-hydroxyethyl acrylate, sodium acrylate, zinc acrylate, the ionic hydrocarbon polymers from the polymerization of α-olefins with α,β-ethylenically unsaturated carboxylic acids.

Useful modified polyolefins include those disclosed in U.S. Pat. Nos. 6,001,484, 6,072,003, 3,264,272, and 3,939, 242, which are incorporated herein by reference.

In one or more embodiments, the mer units of the polyolefin containing the functional groups can be present in the polyolefin in an amount from about 0.05 to about 5 mole percent. For example, in the case of maleated polyethylene, from about 0.005 to about 5 mole percent of the mer units include the residue of maleic acid pendent to the backbone.

In one or more embodiments, useful modified polyolefins can be obtained under the tradename OPTEMA™ TC130 (ExxonMobil), which is an ethylmethacrylate copolymer, and POLYBOND™ (Crompton Uniroyal), or FUSABOND™ (DuPont), which are maleated polypropylenes.

In one or more embodiments, useful thermoplastic elastomer block copolymers include at least one hard block or segment and at least one soft block or segment. In certain embodiments, the block copolymer include two hard blocks with a soft block positioned therebetween (i.e., ABA bock copolymer). In other embodiments, the block copolymer includes two soft blocks with a hard block positioned therebetween (i.e., BAB block copolymer).

In one or more embodiments, the soft blocks can be characterized by a glass transition temperature (Tg) of less than 25° C., in other embodiments less than 0° C., and in other embodiments less than −20° C.

In one or more embodiments, the soft block can include a unit deriving from conjugated diene monomers and optionally vinyl aromatic monomers. Suitable diene monomers include 1,3-butadiene, isoprene, piperylene, phenylbutadiene, and mixtures thereof. Those units deriving from conjugated diene monomers can optionally be hydrogenated. Suitable vinyl aromatic monomers include styrene, alkyl-substituted styrenes such as paramethyl styrene, and α-methyl styrene, as well as mixtures thereof.

In one or more embodiments, the hard blocks can be characterized by a glass transition temperature (Tg) of greater than 25° C., in other embodiments greater than 50° C., and in other embodiments greater than 75° C.

In one or more embodiments, the hard blocks can include polymeric units deriving from vinyl aromatic monomers. Useful vinyl aromatics include styrene, alkyl-substituted styrenes such as paramethyl styrene, and α-methyl styrene, as well as mixtures thereof.

In one or more embodiments, useful thermoplastic elastomer copolymers include, but are not limited to, styrene/butadiene rubber (SBR), styrene/isoprene rubber (SIR), styrene/isoprene/butadiene rubber (SIBR), styrene-butadiene-styrene block copolymer (SBS), hydrogenated styrene-butadiene-styrene block copolymer (SEBS), hydrogenated styrene-butadiene block copolymer (SEB), styrene-isoprene-styrene block copolymer (SIS), styrene-isoprene block copolymer (SI), hydrogenated styrene-isoprene block copolymer (SEP), hydrogenated styrene-isoprene-styrene block copolymer (SEPS), styrene-ethylene/butylene-ethylene block copolymer (SEBE), styrene-ethylene-styrene block copolymer (SES), ethylene-ethylene/butylene block copolymer (EEB), ethylene-ethylene/butylene/styrene block copolymer (hydrogenated BR-SBR block copolymer), styrene-ethylene/butylene-ethylene block copolymer (SEBE), ethylene-ethylene/butylene-ethylene block copolymer (EEBE) and mixtures thereof. Preferred copolymers include hydrogenated styrene-butadiene-styrene block copolymer (SEBS), and hydrogenated styrene-isoprene-styrene block copolymer (SEPS).

In one ore more embodiments, the block copolymers include those disclosed in U.S. Pat. No. 6,177,517 B1, and U.S. Pat. No. 6,369,160 B1, which are incorporated herein by reference, as well as International Patent Applications WO 96/20249 and WO 96/23823, which is incorporated herein by reference.

In one or more embodiments, the crystallizable propylene copolymers include copolymers of propylene and at least one alpha-olefin. The copolymers include from about 5 to about 35, in other embodiments from about 10 to about 30, and in other embodiments from about 12 to about 20 mole percent units deriving from the comonomer (ethylene). In one or more embodiments, these crystallizable propylene copolymers can be characterized by propylene crystallinity.

Useful propylene copolymers are disclosed in U.S. Pat. Nos. 6,268,438, 6,288,171, and 6,245,856, which are incorporated herein by reference. Useful propylene copolymers are available under the tradename VISTAMAXX™ 1000, 2000, and 3000 (Exxon Mobil).

In one or more embodiments, chlorinated polyolefins include chlorinated poly-alpha-olefins. These poly-alpha-olefins may include from about 25 to about 45, and in other embodiments from about 30 to about 40 percent by weight chlorine, where the weight percent includes the weight of the chlorine atoms attached to the polymer backbone with respect to the overall weight of the polymer.

Chlorinated polyolefins are commercially available under the tradename TYRIN™ (DuPont).

In one or more embodiments, ionomers include polymers having a backbone composed of a thermoplastic resin and having side chains or groups pendent to that backbone that are sufficiently polar so as to have the capability of forming ionic domains (i.e., the capability to associate with one another so as to form "physical crosslinks").

Ionomeric polymers can be prepared by attaching acid groups to the polymer and then neutralizing the acid moiety with basic metal compounds (e.g., metal hydroxides, metal salts, etc.) or basic nitrogen compounds (i.e., ammonia, amines, etc.) to ionically link the polymers. The metal ions employed can include alkali metals or alkaline earth metals.

The acid group may be introduced into the polymer chain in a variety of ways. One way is by introducing acid groups on the predominant polymer, e.g., sulfonating polystyrene or by copolymerising an alpha, beta-ethylenically unsaturated acid monomer with the predominant monomer, or by graft-polymerizing an alpha, beta-ethylenically unsaturated acid moiety on the predominant polymer.

Typical examples of ionomers employing salts of carboxylic acid type pendent groups are disclosed in British Patent No. 1,011,981; U.S. Pat. Nos. 3,264,272; 3,322,734; 3,338,734; 3,355,319; 3,522,222; and 3,522,223, which are incorporated herein by reference. Examples of ionomers employing phosphonate-type pendent groups include those disclosed in U.S. Pat. Nos. 3,094,144; 2,764,563, 3,097,194; and 3,255,130, which are incorporated herein by reference. Examples of ionomers employing sulfonate-type pendent groups include those disclosed in U.S. Pat. Nos. 2,714,605; 3,072,618; and 3,205,285, which are incorporated herein by reference. The polar groups pendent to the thermoplastic backbone can be present in from at least about 0.2 to about as high as 15 mole % (i.e., 0.2-15 moles per mole of monomer repeating unit), or in other embodiments 0.5 to 10 mole % of the total polymer.

Examples of thermoplastic ionomers include sulfonated polystyrene, sulfonated poly-tertiary butylstyrene, sulfonated polymethylstyrene, sulfonated polyethylene, sulfonated polypropylene, sulfonated polybutene-1, sulfonated styrene/methyl methacrylate copolymers, sulfonated styrene/acrylonitrile copolymers, methacrylonitrile copolymers, sulfonated polyformaldehyde and copolymers, sulfonated polyvinylchloride, sulfonated block copolymers of polyethylene oxide and polystyrene, acrylic acid copolymers with styrene, acrylic acid copolymers with methyl methacrylate. In one or more embodiments, the thermoplastic ionomer can be sulfonated polystyrene or sulfonated polyethylene and its copolymers. In addition to direct sulfonation of these polymers or copolymers, a technique for incorporating a proper amount of sulfonate salt in these polymers includes copolymerizing a suitable diene or di-functional molecule at a low level (e.g., 0.5 to 10%) with the desired monomer. For example, the copolymerization of 2 to 5 weight percent of ethylidene norbornene with ethylene using coordination catalysts provides a polyethylene with a small amount of unsaturation, yet the high crystallinity of polyethylene can still be maintained.

Useful ionomers are commercially available under the tradename SURLYN™ (DuPont) and IOTEK™ (Exxon Mobil).

In one or more embodiments, synthetic oils include polymers and oligomers of butenes including isobutene, 1-butene, 2-butene, butadiene, and mixtures thereof. In one or more embodiments, these oligomers include isobutenyl mer units. Exemplary synthetic oils include polyisobutylene, poly(isobutylene-co-butene), polybutadiene, poly(butadiene-co-butene), and mixtures thereof.

In one or more embodiments, the synthetic oils include synthetic polymers or copolymers having a viscosity in excess of about 20 cp, in other embodiments in excess of about 100 cp, and in other embodiments in excess of about 190 cp, where the viscosity is measured by a Brookfield viscometer according to ASTM D-4402 at 38° C.; in these or other embodiments, the viscosity of these oils can be less than 4,000 cp and in other embodiments less than 1,000 cp.

In one or more embodiments, these oligomers can be characterized by a number average molecular weight ($M_n$) of from about 300 to about 9,000 g/mole, and in other embodiments from about 700 to about 1,300 g/mole.

Useful synthetic oils can be commercially obtained under the tradenames Polybutene™ (Soltex; Houston, Tex.), Indopol™ (BP; Great Britain), and Parapol™ (ExxonMobil). Oligomeric copolymers deriving from butadiene and its comonomers are commercially available under the tradename Ricon Resin™ (Ricon Resins, Inc; Grand Junction, Colo.).

In one or more embodiments, the thermoplastic vulcanizates of this invention are substantially devoid of mineral oils. By substantially devoid, it is meant that the thermoplastic vulcanizates include less mineral oil than would otherwise have an appreciable impact on the technological features of the thermoplastic vulcanizate. In one or more embodiments, the thermoplastic vulcanizates includes less than 8% by weight, and in other embodiments less than 5% by weight, in other embodiments less than 2% by weight, and in other embodiments less than 1% by weight mineral oil, where the weight percent is based on the total weight of the thermoplastic vulcanizate. In one embodiment, the thermoplastic vulcanizates are devoid of mineral oil. In one or more embodiments, mineral oils include petroleum derived oils such as saturated and unsaturated aliphatic oils, aromatic oils, and naphthenic oils.

In one or more embodiments, useful tackifiers, which may be referred to as hydrocarbon resins, include low molecular weight amorphous, thermoplastic polymers derived from synthetic or natural monomers. These monomers include those derived from petroleum resins including trans-piperylene, aromatics such as styrene, 2-methyl-2-butene; terpene resins including limonene, and β-pinene; rosins such as abietic acid; and various cyclodienes. The resins may be hydrogenated.

In one or more embodiments, useful tackifiers may have a number average molecular weight of from about 0.4 kg/mole to about 2.2 kg/mole and weight average molecular weight of from about 0.5 kg/mole to about 2.5 kg/mole, and in other embodiments, these tackifiers can have a number average molecular weight from about 0.5 kg/mole to about 1.8 kg/mole and a weight average molecular weight from about 2.0 kg/mole to about 2.2 kg/mole.

In one or more embodiments, the tackifiers can have a glass transition temperature ($T_g$) of from about 35° C. to about 90° C., in other embodiments from about 50° C. to about 85° C., and in other embodiments from about 60° C. to about 80° C., as measured by differential scanning calorimetry.

In one or more embodiments, the tackifiers can be characterized by a Brookfield viscosity of from about 100 to about 6,000 cps, in other embodiments from about 1,000 to about 5,500 cps, and in other embodiments from about 3,000 to about 5,000 cps, as measured at 180° C. per ASTM D-4402.

Methods for producing tackifiers are generally known in the art. As noted above, the tackifier resins may be manufactured from synthetic or natural monomers. These monomers can be polymerized by employing thermal coupling techniques as well as numerous catalyst systems that employ transition metals such as aluminum trichloride.

Tackifier resins can be obtained from a variety of commercial sources. For example, useful resins can be obtained under the tradename Escorez™ (ExxonMobil; Houston, Tex.) such as Escorez™ 1000, 2000, 4000, 5000, 7000, and 8000.

In addition to the rubber, thermoplastic resin, and synthetic oil, the thermoplastic vulcanizates of the invention may optionally include reinforcing and non-reinforcing fillers, antioxidants, stabilizers, antiblocking agents, anti-static agents, foaming agents, pigments, flame retardants and other processing aids known in the rubber compounding art. These additives can comprise up to about 50 weight percent of the total composition. Fillers that can be utilized include conventional inorganics such as calcium carbonate, clays, silica, talc, titanium dioxide, carbon black and the like.

In one or more embodiments, the thermoplastic vulcanizates of this invention contain a sufficient amount of the rubber to form rubbery compositions of matter. The skilled artisan will understand that rubbery compositions of matter include those that have ultimate elongations greater than 100 percent, and that quickly retract to 150 percent or less of their original length within about 10 minutes after being stretched to 200 percent of their original length and held at 200 percent of their original length for about 10 minutes.

Thus, in one or more embodiments, the thermoplastic vulcanizates can include at least about 25 percent by weight, in other embodiments, at least about 40 percent by weight, and in other embodiments at least about 50 percent by weight rubber. In one ore more embodiments, the amount of rubber within the thermoplastic vulcanizates can be from about 15 to about 90 percent by weight, in other embodiments from about 45 to about 85 percent by weight, and in other embodiments from about 60 to about 80 percent by weight, based on the entire weight of the rubber and thermoplastic component combined, where the thermoplastic component includes the high viscosity, long-chain branched polyolefin and the at least one other thermoplastic resin.

In one or more embodiments, the thermoplastic vulcanizates may include from about 10 to about 85 percent by weight, in other embodiments from about 15 to about 70 percent by weight, in other embodiments from about 20 to about 50 percent by weight thermoplastic resin based upon the entire weight of the rubber and thermoplastic resin combined. The amount of the thermoplastic resin can also be expressed with respect to the amount of the rubber component. In one embodiment, the thermoplastic vulcanizates may comprise from about 20 to about 400, in other embodiments from about 40 to about 300, and in other embodiments from about 80 to about 200 parts by weight thermoplastic resin per 100 parts by weight rubber.

While optional, thermoplastic vulcanizates of this invention may include from about 1 to about 100 parts by weight high-viscosity oil, in other embodiments from about 5 to about 90 parts by weight high-viscosity oil, in other embodiments from about 20 to about 80 parts by weight high-viscosity oil, and in other embodiments from about 45 to about 75 parts by weight mineral oil per 100 parts by weight rubber.

While optional, the thermoplastic vulcanizates may include from about 1 to about 20 parts by weight, in other embodiments from about 5 to about 18 parts by weight, and in other embodiments from about 10 to about 15 parts by weight hardness modifier per 100 parts by weight rubber.

While optional, the thermoplastic vulcanizates may include from about 1 to about 30, in other embodiments from about 8 to about 25, and in other embodiments from about 10 to about 20 party by weight tackifier per 100 parts by weight rubber.

Fillers, such as carbon black or clay, may be added in amount from about 3 to about 50 parts by weight or in other embodiments from about 5 to about 30 parts by weight, per 100 parts by weight of rubber. The amount of carbon black that can be used depends, at least in part, upon the type of carbon black.

In one or more embodiments, the rubber is cured or crosslinked by dynamic vulcanization. The term dynamic vulcanization refers to a vulcanization or curing process for a rubber contained in a blend with a thermoplastic resin, wherein the rubber is crosslinked or vulcanized under conditions of high shear at a temperature above the melting point of the thermoplastic. Dynamic vulcanization can occur in the presence of the high-viscosity oil, or the high-viscosity oil can be added after dynamic vulcanization (i.e., post added), or both (i.e., some can be added prior to dynamic vulcanization and some can be added after dynamic vulcanization). Certain ingredients, particularly the hardness or adhesion modifiers (e.g., maleated plastics or chlorinated plastics), may be desirably added after dynamic vulcanization. In one or more embodiments, interference with the cure may be minimized by adding these ingredients after dynamic vulcanization. Those skilled in the art will be able to readily identify those ingredients that may be better suited to addition after dynamic vulcanization.

In one embodiment, the rubber can be simultaneously crosslinked and dispersed as fine particles within the thermoplastic matrix, although other morphologies may also exist. Dynamic vulcanization can be effected by mixing the thermoplastic elastomer components at elevated temperature in conventional mixing equipment such as roll mills, stabilizers, Banbury mixers, Brabender mixers, continuous mixers, mixing extruders and the like. Methods for preparing thermoplastic vulcanizates is described in U.S. Pat. Nos. 4,311,628 and 4,594,390, which are incorporated herein by reference for purpose of U.S. patent practice, although methods employing low shear rates can also be used. Multiple step processes can also be employed whereby ingredients such as plastics, oils, and scavengers can be added after dynamic vulcanization has been achieved as disclosed in International Application No. PCT/US04/30517, which is incorporated herein by reference for purpose of U.S. patent practice.

The skilled artisan will be able to readily determine a sufficient or effective amount of vulcanizing agent to be employed without undue calculation or experimentation.

For example, a phenolic resin can be employed in an amount of about 2 to about 10, optionally about 3.5 to about 7.5, and optionally about 5 to about 6, parts by weight per 100 parts by weight rubber. In one or more embodiments, the phenolic resin can be employed in conjunction with stannous chloride and optionally zinc oxide. The stannous chloride can be employed in an amount from about 0.2 to about 10, optionally from about 0.3 to about 5, and optionally from about 0.5 to about 3, parts by weight per 100 parts by weight rubber. The zinc oxide can be employed in an amount from about 0.25 to about 5, optionally from about 0.5 to about 3, and optionally from about 1 to about 2, parts by weight per 100 parts by weight rubber.

Alternatively, a peroxide can be employed in an amount from about $1 \times 10^{-5}$ moles to about $1 \times 10^{-1}$ moles, optionally from about $1 \times 10^{-4}$ moles to about $9 \times 10^{-2}$ moles, and optionally from about $1 \times 10^{-2}$ moles to about $4 \times 10^{-2}$ moles per 100 parts by weight rubber. The amount may also be expressed as a weight per 100 parts by weight rubber. This amount, however, may vary depending on the curative employed. For example, where 4,4-bis(tert-butyl peroxy) diisopropyl benzene is employed, the amount employed may include from about 0.5 to about 12 and optionally from about 1 to about 6 parts by weight per 100 parts by weight rubber. The skilled artisan will be able to readily determine a sufficient or effective amount of coagent that can be used with the peroxide without undue calculation or experimentation. In one or more embodiments, the amount of coagent employed is similar in terms of moles to the number of moles of curative employed. The amount of coagent may also be expressed as weight per 100 parts by weight rubber. For example, where the triallylcyanurate coagent is employed, the amount employed can include from about 0.25 phr to about 20 phr, and optionally from about 0.5 phr to about 10 phr, based on 100 parts by weight rubber.

Despite the fact that the rubber may be partially or fully cured, the compositions of this invention can be processed and reprocessed by conventional plastic processing techniques such as extrusion, injection molding, blow molding, and compression molding. The rubber within these thermoplastic elastomers can be in the form of finely-divided and well-dispersed particles of vulcanized or cured rubber within a continuous thermoplastic phase or matrix. In other embodiments, a co-continuous morphology or a phase inversion can be achieved. In those embodiments where the cured rubber is in the form of finely-divided and well-dispersed particles within the thermoplastic medium, the rubber particles can have an average diameter that is less than 50 µm, optionally less than 30 µm, optionally less than 10 µm, optionally less than 5 µm, and optionally less than 1 µm. In certain embodiments, at least 50%, optionally at least 60%, and optionally at least 75% of the particles have an average diameter of less than 5 µm, optionally less than 2 µm, and optionally less than 1 µm.

The laminates of this invention include a layer of the thermoplastic vulcanizates described herein and layer of a low-friction material. In one or more embodiments, the low-friction material may include a fluorinated polyolefin or a high density polyethylene.

In one or more embodiments, useful fluorinated polyolefins include those hydrocarbon resins where at least 50 equivalent percent, in other embodiments at least 75 equivalent percent, and in other embodiments at least 95 equivalent percent of the hydrogen atoms are replaced by fluorine. In one or more embodiments, the fluorinated polyolefins are perfluorinated.

In one or more embodiments, the fluorine-containing polyolefins include polytetrafluoroethylene, fluorinated ethylene-propylene resin, polyvinylidene fluoride, and mixtures thereof.

In one or more embodiments, useful high density polyethylenes include homopolymers of ethylene, as well as copolymers of ethylene and a comonomer such as alpha olefins. In one or more embodiments, at least 90%, in other embodiments at least 95%, and in other embodiments at least 99% of the polymeric units of the high density polyethylene derive from ethylene; i.e. ethylenyl mer units. In one embodiment, high density polyethylene is a polyethylene homopolymer.

In one or more embodiments, useful high density polyethylenes include those characterized by a density of at least about 0.90 g/cc, in other embodiments at least 0.92 g/cc, and in other embodiments at least 0.94 g/cc, as determined by ASTM D-4883.

In one or more embodiments, the laminates of this invention can be prepared by using molding techniques including injection molding. In certain embodiments, the low-friction or slip layer is first formed, and then the thermoplastic vulcanizate is injection molded or deposited onto the slip layer. In other embodiments, the thermoplastic vulcanizate layer is first injection molded, and then the slip layer is molded thereon. In certain embodiments, particularly where the slip layer includes high density polyethylene, a two-shot injection molding process can be employed whereby the thermoplastic vulcanizate or slip layer is first formed by injection molding followed by a second injection molding step that deposits the other layer onto the first layer that was molded. In other embodiments, the laminates can be made by coextrusion techniques. In one embodiment, particularly where the slip layer includes high density polyethylene, a simultaneous coextrusion process can be employed. In other embodiments, particularly where polyfluorotetraethylene is employed as the slip layer, an in-line coextrusion process can be employed whereby a pre-extruded layer of polyfluorotetraethylene is provided and the thermoplastic vulcanizate is extruded thereon.

In one or more embodiments, the process of preparing laminates with the thermoplastic vulcanizates and the fluorine-containing thermoplastic resins includes modification of the laminate surface of the fluorine-containing thermoplastic resin layer. In other words, a substrate of a fluorine-containing thermoplastic resin is provided, a surface of the substrate is modified, and the thermoplastic vulcanizate is subsequently deposited on the modified surface. Sheets of low-friction material such as polyfluorotetraethylene are commercially available. Several techniques can be employed to modify the surface of the fluorine-containing thermoplastic resin substrate. In one or more embodiments, modification of the surface of a fluorine-containing thermoplastic layer or substrate includes replacing the fluorine atoms at the surface with functional groups that can react or interact with an adjacent layer. These functional groups may include hydroxyl groups, carbonyl groups, and carboxyl groups. In order to achieve the replacement of fluorine atoms, they are first displaced by using an etchant. For example, sodium-based etchants are known. In other examples, plasma etching, which is known, can be used. In one or more embodiments, a primer may be deposited onto the modified surface. Useful primers include isocyanates such as those available under the tradename CHEMLOK™ (Lord Corporation). Sheets of fluorinated thermoplastics that include a modified or treated surface are commercially available from companies such as Action Technologies.

The Laminates of this invention are particularly useful as furniture sliders. The furniture sliders can include a variety of shapes and sizes. While the invention is not necessarily limited by the shape of the slider, in one or more embodiments the sliders may include a round shape, an oval shape, a square shape, a triangular shape, or a rectangular shape, as determined from the perspective of where the slider contacts the floor.

The thickness of each layer of the slider can vary based upon several factors. In one or more embodiments, the layer comprising the thermoplastic vulcanizates of this invention can be from about 2 mm to about 10 mm thick, in other embodiments from about 3 mm to about 7 mm thick, and in other embodiments from about 4 mm to about 6 mm thick. In one or more embodiments, the layer comprising the low friction material (e.g. polytetrafluoroethylene) can be from about 0.1 mm to about 2 mm thick, in other embodiments from about 0.15 mm to about 1 mm thick, and in other embodiments from about 0.2 mm to about 0.5 mm thick.

One embodiment of a furniture slider according to the present invention is shown in FIG. 1. The slider 10 includes thermoplastic vulcanizates layer 12 and low-friction layer 14. Thermoplastic vulcanizate layer 12 includes an upper surface layer 16, which can interface with the bottom of furniture. Low-friction layer 14 includes lower surface layer 18, which can interface with the floor. Thermoplastic vulcanizates layer 12 and low-friction layer 14 contact each other at interface 20. Slider 10 may also optionally include adhesive layer 22, which may include a double-sided tape.

In one or more embodiments, the furniture sliders can be attached to furniture in a conventional manner, which includes either attaching the slider permanently or removably. For example, furniture sliders can be attached by using commercial double-sided adhesive tapes. In one or more of these embodiments, the laminates include at least three layers including a slip layer, a thermoplastic vulcanizate layer, and an adhesive tape layer. They can also be attached by using various mechanical fastening devices such as nails, screws, rivets, or bolts.

Other uses of the laminates of this invention include window channels or glass-run channels, which are often employed in the automotive industry. Practice of this invention does not necessarily limit the type or configuration of the window channel. Typical configurations are disclosed in U.S. Pat. Nos. 6,602,589, 5,447,671, 5,424,135, and 5,110,685, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Samples 1-17

Seventeen thermoplastic vulcanizates were prepared by dynamically vulcanizing a rubber with a phenolic resin. The type and amount of extender oil was varied as set forth in Table I. The extender oils were added before and after dynamic vulcanization. Specifically, those labeled "pre-cure" were included prior to dynamic vulcanization, and those labeled "post-cure" were added after dynamic vulcanization.

The thermoplastic vulcanizates of Samples 1-17 were prepared by employing conventional techniques within a Brabender mixer. The following ingredients were used in each sample. The ingredients included 100 parts by weight rubber, 10 parts by weight clay, 2 parts by weight zinc oxide, 1.3 parts by weight stannous chloride, 61 parts by weight thermoplastic polypropylene homopolymer, 12 parts by weight carbon black concentrate (4.8 parts carbon black and 7.2 parts polypropylene), 6 parts by weight phenolic resin, and extender oil as set forth in Table I.

The elastomeric copolymer was poly(ethylene-co-propylene-co-5-ethylidene-2-norbornene) obtained under the tradename VISTALON™ 7500 (ExxonMobil) which was characterized by a Mooney Viscosity ($ML_{1+4}$@125° C.) of 82. Sample 2 included 50 parts by weight of the VISTALON 7500 and 50 parts by weight EXXPRO™ 3745 (ExxonMobil) The polypropylene homopolymer was characterized by an MFR of about 18 per ASTM D-1238 at 230° C. and 2.16 Kg load. The tackifier resin included a hydrogenated water white cyclic aliphatic petroleum hydrocarbon resin obtained under the tradename ESCOREZ™ 5320 (ExxonMobil). The synthetic oil included a poly(isobutylene-co-butene) copolymer obtained under the tradename INDOPOL™ H100 (BP/Amoco). The parafinic oil was characterized by a viscosity of about 500 sus at 100° F., and was obtained under the tradename SUNPAR™ 150M (Sunoco). The propylene copolymer was obtained under the tradename VISTAMAXX™3000 (Exxon Mobil). The chlorinated polyethylene was obtained under the tradename Tyrin 3611P™ (DuPont). The ethylmethacrylate copolymer was obtained under the tradename Optema TC 140™ (ExxonMobil).

The amounts provided in Table I, as well as other tables in this specification, are provided in parts by weight per 100 parts by weight rubber (phr) unless otherwise specified.

TABLE I

| Material | 1 | 2 | 3 | 4 | 5 | 6 | 7 | 8 |
|---|---|---|---|---|---|---|---|---|
| Exxon Escorez 5320 | 16.5 | 16.5 | 16.5 | 16.5 | 16.5 | 16.5 | 16.5 | — |
| Synthetic Oil (pre-cure) | 32.15 | 32.15 | 32.15 | 32.15 | 32.15 | 32.15 | — | — |
| Synthetic Oil (post-cure) | 32.15 | 32.15 | 32.15 | 32.15 | 32.15 | 32.15 | — | — |
| Ethylmethacrylate copolymer | — | — | — | — | — | — | — | — |
| Propylene Copolymer | — | — | — | — | — | — | — | — |
| Chlorinated Polyethylene | — | — | — | — | — | — | — | — |
| Mineral Oil (pre-cure) | — | — | — | — | — | — | — | — |
| Mineral Oil (post-cure) | — | — | 25 | 50 | 75 | 100 | — | — |
| Shore A Hardness | 80 | 81 | 77 | 70 | 63 | 58 | 90 | 91 |
| Ultimate Tensile Strength (MPa) | 10.60 | 10.14 | 6.70 | 4.98 | 3.68 | 2.01 | 11.2 | 14.49 |
| Elongation (%) | 299 | 222 | 189 | 198 | 255 | 106 | 172 | 243 |
| 100% Mod. (MPa) | 5.47 | 5.14 | 4.32 | 3.34 | 2.34 | 1.98 | 9.74 | 10.54 |
| Tension Set (%) | 10.50% | 12.00% | 10.00% | 9.50% | 12.50% | Broke | 18.25% | 18.50% |
| LCR | 140 | 117 | 115 | 90 | 68 | 47 | 295 | 335 |
| Compression Set (%) | 35.7 | 37.1 | 30.3 | 31.1 | 40.4 | 50.2 | 39.4 | 39.5 |
| Adhesion (N) | 142 | 134 | 112 | 64.1 | 42.3 | 31 | 195 | 230 |

| Material | 9 | 10 | 11 | 12 | 13 | 14 | 15 | 16 | 17 |
|---|---|---|---|---|---|---|---|---|---|
| Exxon Escorez 5320 | — | 16.5 | 16.5 | 16.5 | 16.5 | 16.5 | 16.5 | 16.5 | 16.5 |
| Synthetic Oil (pre-cure) | 32.15 | — | 32.15 | 32.15 | 32.15 | 32.15 | 32.15 | 32.15 | 32.15 |
| Synthetic Oil (post-cure) | 32.15 | — | 32.15 | 32.15 | 32.15 | 32.15 | 32.15 | 32.15 | 32.15 |
| Ethylmethacrylate copolymer | — | — | 15 | — | — | 15 | — | — | — |
| Propylene Copolymer | — | — | — | 15 | — | — | 15 | — | — |
| Chlorinated Polyethylene | — | — | — | — | 15 | — | — | 15 | 15 |
| Mineral Oil (pre-cure) | — | 32.15 | — | — | — | — | — | — | — |
| Mineral Oil (post-cure) | — | 32.15 | — | — | — | — | — | — | — |
| Shore A Hardness | 78 | 78 | 79 | 81 | 82 | 78 | 78 | 80 | 71 |
| Ultimate Tensile Strength (MPa) | 9.09 | 9.57 | 7.32 | 8.73 | 8.80 | 8.87 | 10.04 | 8.32 | 2.80 |
| Elongation (%) | 226 | 231 | 245.2 | 290.35 | 189.4 | 299.2 | 333.8 | 219.9 | 236.4 |
| 100% Mod. (MPa) | 5.72 | 5.59 | 4.69 | 5.05 | 6.02 | 4.46 | 4.63 | 5.31 | 2.64 |
| Tension Set (%) | 11.50% | 10.00% | 10.50% | Broke | 10.50% | 10.00% | 11.25% | 10.00% | 40.50% |
| LCR | 146 | 135 | 159 | 157.8 | 154 | 154 | 144.2 | 150.8 | 125.9 |
| Compression Set (%) | 38.7 | 30.5 | 30.0 | 33.2 | 32.6 | 32.1 | 32.2 | 28.3 | 79.0 |
| Adhesion (N) | 149 | 68.5 | 137 | 147 | 145 | 135 | 141 | 149 | 80 |

Shore hardness was determined according to ASTM D-2240. Ultimate tensile strength, ultimate elongation, and 100% modulus were determined according to ASTM D-412 at 23° C. by using an Instron testing machine. Tension set was determined according to ASTM D-142. Compression Set was determined according to ISO 815-A. LCR Viscosity is measured with a Dynisco™ Capillary rheometer at 30:1 L/D (length/diameter) at 1200 s$^{-1}$ at 204° C. Adhesion was analyzed according to a lap shear test whereby two samples (1' by 4') were bonded together with a two-sided tape (MacTac) with an overlap area of about 1'×1', and the samples were pulled at 1.27 cm/min. until failure.

The data in Table I suggests that the presence of paraffinic extender oil has an adverse impact on the adhesive properties of the thermoplastic vulcanizate as demonstrated by the relatively low adhesion values for Samples 3-6 and 10. While rather high adhesion values were obtained for those samples (i.e., Samples 7 and 8) that did not include extender oil, the hardness of the thermoplastic vulcanizate, as well as the viscosity, suggests that these thermoplastic vulcanizates would not be technologically useful for molding, particularly injection molding. Notably, Sample 7 includes a tackifier, but the presence of the tackifier did not have an appreciable impact on the viscosity or hardness. Samples 1, 2, and 9, which are representative of the thermoplastic vulcanizates of this invention, show technologically useful adhesion with acceptable hardness and viscosity. Surprisingly, the use of the synthetic oil (i.e., poly(isobutylene-co-butene)) did not have a deleterious impact on the adhesive properties of the thermoplastic vulcanizate, where the parafinic oil did. The addition of butyl rubber in Sample 2 did not have an appreciable impact on the properties of the thermoplastic vulcanizate.

Samples 18-20

Three additional thermoplastic vulcanizates were prepared in a manner similar to Samples 1-17, except that the rubber employed in each rubber employed in each sample was varied and the samples were made using large-scale apparatus per U.S. Pat. No. 4,594,390. Specifically, the thermoplastic vulcanizates of Samples 18-20 were prepared by employing conventional techniques within a Brabender mixer. The following ingredients were used in each sample. The ingredients included 100 parts by weight rubber, 10 parts by weight clay, 2 parts by weight zinc oxide, 1.3 parts by weight stannous chloride, 16.5 parts by weight tackifier resin, 61 parts by weight polypropylene homopolymer, 12 parts by weight carbon black concentrate (4.8 parts carbon black and 7.2 parts polypropylene), 6 parts by weight phenolic resin, and 64.3 parts by weight synthetic oil. Sample 20 included 2 parts by weight magnesium oxide and 1 part by weight stearic acid. The rubber employed in Sample 18 included poly(ethylene-co-propylene-co-5-ethylidene-2-norbornene) that was obtained under the tradename VISTALON™ 2504 (ExxonMobil), and was characterized by a Mooney Viscosity of $ML_{1+4}$@125° C. of 25. The rubber employed in Sample 19 was obtained under the tradename VISTALON™ 7500. The rubber employed in Sample 20 was obtained under the tradename EXPRO™ 3745 (ExxonMobil). The synthetic oil was obtained under the tradename INDOPOL™ H100.

Each of Samples 18-20 were subjected to tests similar to those in Samples 1-17, and the results of this testing is set forth in Table II.

TABLE II

|  | Sample | | |
| --- | --- | --- | --- |
|  | 18 | 19 | 20 |
| Shore A Hardness median | 81.7 | 84.0 | 81 |
| Specific Gravity | 0.947 | 0.937 | 0.965 |
| Ultimate Tensile Strength median (MPa) | 7.35 | 9.48 | 8.73 |
| Ultimate Elongation (%) median | 399 | 432 | 398 |
| Modulus @100 median (MPa) | 3.63 | 4.27 | 4.04 |
| Color L median | 17.19 | 17.63 | 17.35 |
| a median | −0.2 | 0.02 | 0.01 |
| b median | −0.55 | −.53 | −0.47 |
| LCR (1200 1/s) | 101.7 | 110.9 | 97 |
| ESR median | 65 | 100 | 147 |
| Tension Set median | 25.0 | 22.0 | 25 |
| Compression Set, 22 hr @ 100° C. (%) | 41.18 | 35.34 | 38 |

The data in Table II shows that at least one or more of the advantageous features of this invention can be achieved with various rubbers.

Various modifications and alterations that do not depart from the scope and spirit of this invention will become apparent to those skilled in the art. This invention is not to be duly limited to the illustrative embodiments set forth herein.

What is claimed is:

1. A laminate comprising:
   a first layer comprising a fluorine-containing thermoplastic resin or a high-density polyethylene resin; and
   a second layer contacting said first layer, where the second layer includes a thermoplastic vulcanizate including:
   a) a dynamically vulcanized rubber where the rubber is an elastomeric copolymer deriving from the polymerization of ethylene, propylene, and at least one diene monomer.
   b) a thermoplastic resin; and
   c) a synthetic oil, where the synthetic oil is a oligomer of one or more butene monomers, where the synthetic oil is characterized by a viscosity in excess of about 20 cp as measured by a Brookfield viscometer according to ASTM D-4402 at 38° C., and where the thermoplastic vulcanizate is substantially devoid of mineral oils.

2. The thermoplastic vulcanizate of claim 1, where the thermoplastic vulcanizate includes from about 1 to about 20 parts by weight synthetic oil per 100 parts by weight rubber.

3. The thermoplastic vulcanizate of claim 1, where the synthetic oil is selected from the group consisting of polyisobutylene, poly(isobutylene-co-butene), polybutadiene, or poly(butadiene-co-butene).

4. The thermoplastic vulcanizate of claim 1, further comprising a tackifier resin.

5. The thermoplastic vulcanizate of claim 1, further comprising a hardness or adhesion modifier.

6. The thermoplastic vulcanizate of claim 1, where the thermoplastic vulcanizate is substantially devoid of polyethylene.

7. The thermoplastic vulcanizate of claim 1, where the thermoplastic resin is polypropylene.

8. The laminate of claim 1, where said fluorine-containing thermoplastic resin comprises polytetrafluoroethylene.

9. The laminate of claim 1, where the thermoplastic vulcanizate includes less than 1% by weight mineral oils.

10. The laminate of claim 1, where the thermoplastic vulcanizate is devoid of mineral oils.

11. A furniture slider comprising the laminate of claim 1.

12. The laminate of claim 1, where the synthetic oil is characterized by a viscosity of less than 4,000 cp as measured by a Brookfield vicometer according to ASTM D-4402 at 38° C.

13. The laminate of claim 1, where the synthetic oil is characterized by a viscosity of less than 1,000 cp as measured by a Brookfield vicometer according to ASTM D-4402 at 38° C.

14. The laminate of claim 1, where the synthetic oil is characterized by a number average molecular weight of from about 300 to about 9,000 g/mole.

15. The laminate of claim 1, where the synthetic oil is characterized by a number average molecular weight of from about 700 to about 1,300 g/mole.

* * * * *